W. E. ROBERSON.
VEHICLE BRAKE.
APPLICATION FILED JULY 23, 1914.
1,143,320. Patented June 15, 1915.
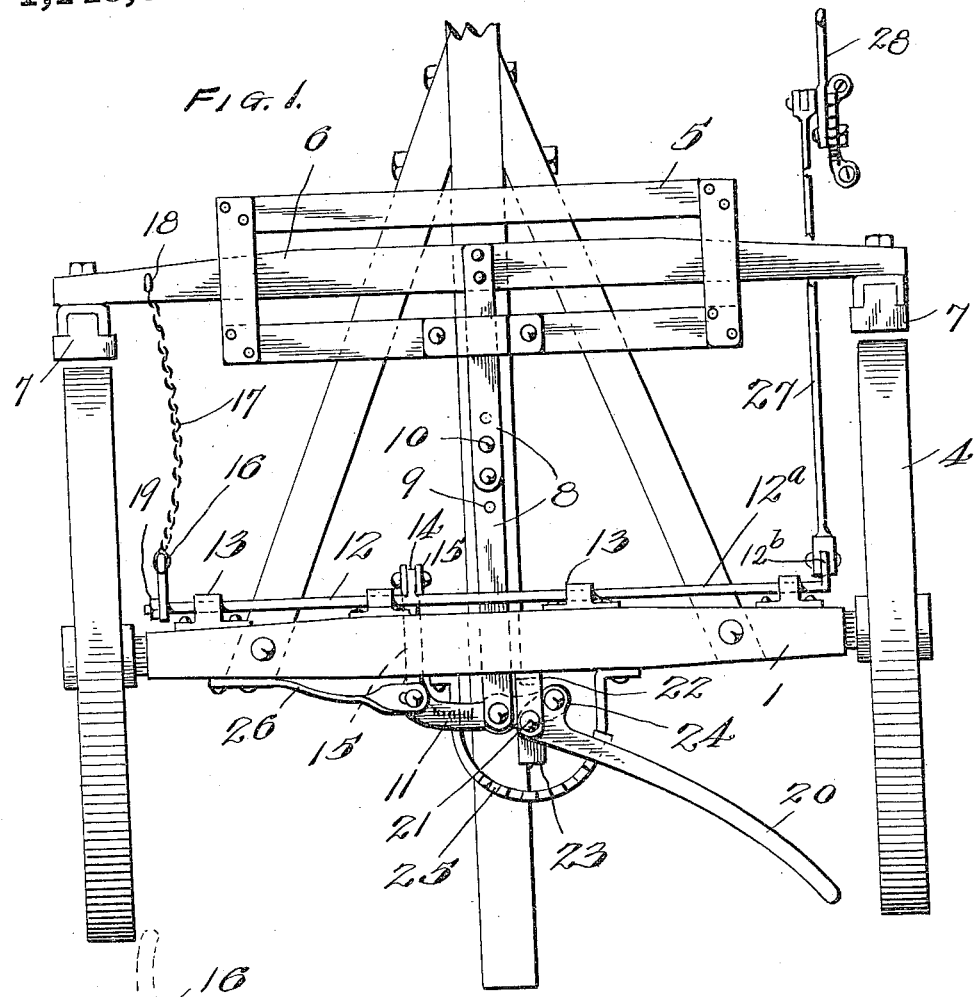
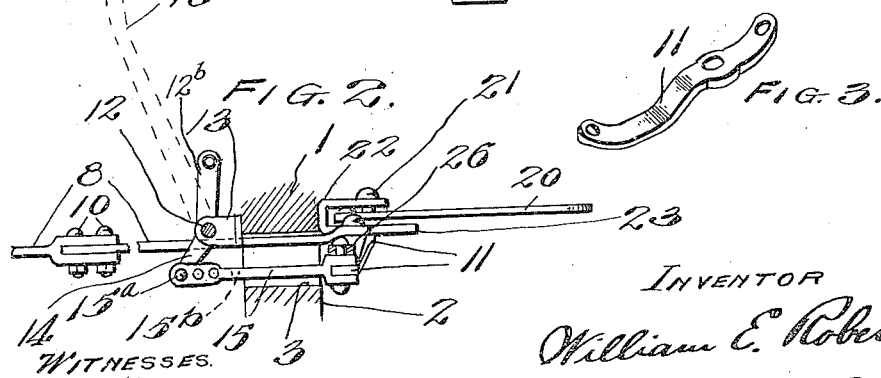
WITNESSES.
C. K. Davies.
M. A. Hood.
INVENTOR
William E. Roberson
by Beck Becker Smith
Attorneys.

UNITED STATES PATENT OFFICE.

WILLIAM E. ROBERSON, OF DICKERSON, MARYLAND.

VEHICLE-BRAKE.

1,143,320.

Specification of Letters Patent. Patented June 15, 1915.

Application filed July 23, 1914. Serial No. 852,747.

*To all whom it may concern:*

Be it known that I, WILLIAM E. ROBERSON, a citizen of the United States, residing at Dickerson, Maryland, have invented certain new and useful Improvements in Vehicle-Brakes, of which the following is a specification.

One of the principal objects of my invention is to provide brake mechanism capable of operation from two or more different points, by means of different operating levers, one of which may be removed in some cases.

The invention is especially adapted for use on wagon running-gear of the class designed to carry either a wagon-body or a hay-rack, but I do not limit myself necessarily to this class of vehicle.

Another object of the invention is to provide a compound braking leverage.

The characteristics and advantages of the invention will be further described hereinafter in connection with a detail description of the accompanying drawing, which illustrates one embodiment of the invention.

It is to be understood, that the invention is capable of embodiment in many different forms.

In the drawings:—Figure 1 is a top plan of the rear end of a vehicle running-gear; Fig. 2 is a vertical, fragmentary section through the axle and bolster; Fig. 3 is a perspective detail of the connecting lever.

Reference character 1 designates a wagon bolster and 2 an axle having an aperture 3 between them, which is utilized to accommodate a part of the brake mechanism. On the wagon frame, forward of the wheels 4, is secured a brake frame 5, and in this is movably mounted the brake beam 6, carrying at its ends, and preferably detachably, brake shoes 7. The particular character of brake shoes and their mounting is not a part of this invention. To the brake beam, at the center, is connected link 8, preferably made adjustable by making it in two parts and connecting the parts by means of holes 9 and pins 10. This link passes through aperture 3 between the bolster and axle, and behind the bolster is pivotally connected to a connecting lever 11. A rock-shaft 12 is mounted in bearings 13 on the front of the bolster. This carries an arm 14 pivotally connected to link 15, which also passes through aperture 3. The rear end of link 15 is pivotally connected to the left-hand end of the connecting lever 11, as seen in Fig. 1. In a preferred construction, a plurality of holes 15$^a$ are provided at the front end of link 15, so that arm 14 may be connected with the link at different points by means of a pin, this arrangement being made to accommodate different thicknesses of bolsters, which may be found in different wagons, in an obvious manner. The shaft 12 carries, at one end, brake lever 16, which may be operated by hand or by a chain 17 and hook 18 mounted on the brake beam, or in any other well-known way. This lever is also detachably secured to shaft 12 by a nut 19 so that it may be removed in some cases. The rear lever 20 is fulcrumed at 21 in a bracket 22, secured to the bolster, and the lower member 23 of this bracket extends rearward above connecting lever 11, a considerable distance, to guide the lever in its movement and prevent it from riding up, which it has a slight tendency to do in this particular construction, on account of its curvature. The lever is provided with a short offset portion 24 pivoted to the adjacent end of connecting lever 11. Lever 20 is provided with a suitable tooth to engage a ratchet sector 25 over which it travels to lock the lever in position. A spring 26 may in some cases be pivotally connected at one end to the bolster and at the other end to link 15, or the adjacent end of lever 11. In this particular embodiment the end of the spring is shown slotted and connected to the pivot pin, which connects link 15 with lever 11.

Depending upon the type of body used on the running gear, either or both of levers 16 and 20 may be used to apply the brake. With lever 20 in the off position, as shown, engagement with ratchet sector 25 prevents it from moving farther to the right, or toward the off position of the brake. A pull on lever 16 will then cause connecting lever 11 to fulcrum at its point of connection with offset 24 of lever 20, and link 8 is pulled very forcibly with a combined leverage, due to the difference in the lengths of lever 16 and arm 14, and the leverage advantages afforded by connecting lever 11, and the brake shoes 7 are thus firmly applied to the wheels. Lever 20 may be moved to set the brake, and in this case the connecting lever fulcrums at its point of connection with link 15, while link 8 is moved in the same direction as before, a compound leverage also being afforded by the difference in lengths of the long arm and short arm of lever 20 added to the lever advantage gained through connecting lever 11. When lever 20 is moved as above, the connecting lever 11 tends to move link 15 to the left, as seen in Fig. 2. Arm 14 then assumes an approximately horizontal position; link 15 can move no farther, and connecting lever 11 fulcrums at its point of connection with link 15. In this movement, the end of connecting lever adjacent to the bracket 22 moves to the rear under the lower member 23 of the bracket, which guides the lever and prevents it from riding up, as in this particular embodiment of the invention it has some tendency to do. The brake may be locked by engaging lever 20 with the sector 25 in any position, and the braking effect may then be increased by pulling lever 16. The brake may also be locked on by hooking chain 17 over hook 18 on the brake beam.

In some cases, lever shaft 12 may be extended across the front of the bolster, as at 12$^a$, and may be connected by an arm 12$^b$ and a link 27 with lever 28 secured to the wagon-body in any suitable position.

In some cases, for instance when certain bodies are used on the running gear, lever 16 is to be removed by removing nut 19, and in this case, without providing special means for the purpose, there may be some difficulty in positively releasing the brake shoes from the wheels. This is overcome by the spring 26, which applies a resistance to the movement of the adjacent end of connecting lever 11 and prevents that end of the lever from moving away from the bolster when the brake lever is moved to off-position, and thus the movement of lever 20 causes link 8 to positively move the brake shoes away from the wheel. It will be noticed that the release of the brake by moving brake lever 16 rearward is entirely positive, since lever 20 is held securely by the sector 25. Other means for insuring positive release of the brake by the movement of lever 20 or when lever 16 is dismounted may be employed, such for instance as passing a pin through a hole 15$^b$ shown in dotted lines in Fig. 2. This pin in the releasing movement of lever 20 will engage the bolster or axle and provide a positive fulcrum for the connecting lever to insure the positive release of the brakes, as above explained.

I claim:—

1. In a brake mechanism, the combination of a wagon running gear comprising a bolster, a bracket fixed to the rear thereof, a rock-shaft mounted at the front of the bolster, an arm thereon, a link pivoted to said arm, an operating lever fulcrumed in said bracket, a connecting lever connected at one end with said operating lever and at the other end with said link, another operating lever connected with said rock-shaft to rotate same, a brake beam and a connection between said beam and said connecting lever.

2. In brake mechanism, the combination of a wagon running gear comprising a bolster, a bracket fixed to the rear thereof, a rock-shaft mounted at the front of the bolster, an arm thereon, a link pivoted to said arm, an operating lever fulcrumed in said bracket, a connecting lever connected at one end with said operating lever and at the other end with said link, a member of said bracket being arranged to guide the adjacent end of said connecting lever, another operating lever connected with said rock-shaft to rotate same, a brake beam and a connection between said beam and said connecting lever.

3. In brake mechanism, the combination of a wagon running gear comprising a bolster, a bracket fixed to the rear thereof, a rock-shaft mounted at the front of the bolster, an arm thereon, a link pivoted to said arm, an operating lever fulcrumed in said bracket, a connecting lever connected at one end with said operating lever and at the other end with said link, another operating lever carried by said rock-shaft to rotate same, a brake beam and a connection between said beam and said connecting lever.

WILLIAM E. ROBERSON.

Witnesses:
N. S. BURRIER,
L. B. SCHOLL.

Copies of this patent may be obtained for five cents each, by addressing the "Commissioner of Patents, Washington, D. C."